(12) United States Patent
Woolley et al.

(10) Patent No.: US 11,369,945 B2
(45) Date of Patent: Jun. 28, 2022

(54) SIMPLE SINGLE-STEP POROUS POLYMER MONOLITH FOR DNA EXTRACTION

(71) Applicants: Adam T. Woolley, Orem, UT (US); Radim Knob, Sandy, UT (US)

(72) Inventors: Adam T. Woolley, Orem, UT (US); Radim Knob, Sandy, UT (US)

(*) Notice: Subject to any disclaimer, the term of this patent is extended or adjusted under 35 U.S.C. 154(b) by 259 days.

(21) Appl. No.: 16/355,692

(22) Filed: Mar. 15, 2019

(65) Prior Publication Data
US 2020/0078764 A1 Mar. 12, 2020

Related U.S. Application Data

(60) Provisional application No. 62/643,339, filed on Mar. 15, 2018.

(51) Int. Cl.
| | | |
|---|---|---|
| *B01J 20/26* | (2006.01) | |
| *B01J 20/28* | (2006.01) | |
| *G01N 30/60* | (2006.01) | |
| *G01N 30/52* | (2006.01) | |
| *G01N 21/64* | (2006.01) | |

(52) U.S. Cl.
CPC ....... *B01J 20/28042* (2013.01); *B01J 20/261* (2013.01); *B01J 20/265* (2013.01); *G01N 21/64* (2013.01); *G01N 30/6095* (2013.01); *G01N 2030/528* (2013.01)

(58) Field of Classification Search
CPC .. B01J 20/28042; B01J 20/261; B01J 20/265; G01N 21/64; G01N 30/6095; G01N 2030/528
See application file for complete search history.

(56) References Cited

U.S. PATENT DOCUMENTS

| | | | | |
|---|---|---|---|---|
| 2004/0101442 | A1* | 5/2004 | Frechet | B01L 3/502707 422/506 |
| 2005/0009101 | A1* | 1/2005 | Blackburn | B01L 7/52 435/7.1 |
| 2012/0220022 | A1* | 8/2012 | Ehrlich | G01N 15/14 435/286.2 |
| 2013/0266956 | A1* | 10/2013 | Tia | G01N 33/54366 435/7.1 |
| 2013/0277218 | A1* | 10/2013 | Mudrik | B01L 3/502792 204/454 |
| 2015/0101930 | A1* | 4/2015 | Liu | B01D 61/427 204/450 |
| 2016/0032371 | A1* | 2/2016 | Light | C12Q 1/6806 506/2 |

(Continued)

OTHER PUBLICATIONS

West, J., and Satterfield, B. "Fabrication of porous polymer monoliths in microfluidic chips for selective nucleic acid concentration and purification". In P. Floriano (Eds.), Microchip-based assay systems (pp. 9-21). Humana Press. (Year: 2007).*

(Continued)

*Primary Examiner* — Benjamin L Lebron
(74) *Attorney, Agent, or Firm* — James Sonntag

(57) ABSTRACT

A method and microfluidic device with a porous polymer monolith in a channel of the device with capture affinity element (such as an oligonucleotide complementary to a DNA target from the KPC antibiotic resistance gene) on the monolith surface.

14 Claims, 12 Drawing Sheets

(56) References Cited

U.S. PATENT DOCUMENTS

2016/0177382 A1* 6/2016 Han ................ G01N 27/44704
 506/9

OTHER PUBLICATIONS

Robledo, I., et al., "Detection of the KPC gene in *Escherichia coli*, Klebsiella pneumoniae, Pseudomonas aeruginosa, and Acinetobacter baumannii during a PCR-based nosocomial surveillance study in Puerto Rico", Antimicrobial agents and chemotherapy, 55, 6, pp. 2968-2970. (Year: 2011).*

Thaitrong, N., et al., "Polymerase chain reaction-capillary electrophoresis genetic analysis microdevice with in-line affinity capture sample injection", Anal. Chem., 81, pp. 1371-1377. (Year: 2009).*

\* cited by examiner

SIMPLE SINGLE-STEP POROUS POLYMER MONOLITH FOR DNA EXTRACTION

CROSS REFERENCE TO RELATED APPLICATIONS

Priority is claimed from U.S. Provisional Patent Application 62/643,339, filed Mar. 15, 2018, which is hereby incorporated by reference

FEDERAL SUPPORT

This invention was made with government support under Grant Number R01 AI116989 awarded by the National Institutes of Health. The government has certain rights in the invention.

BACKGROUND

Microfluidics have been widely used for DNA analysis by miniaturizing Polymerase Chain Reaction (PCR) [7,8] or using DNA arrays [9,10]. Confinement of a sample into a microfluidic channel reduces the risk of sample contamination and decreases the volume required for an assay [7]. Porous monoliths have found wide use in microfluidics in extraction and separation applications [11,12] thanks to their ease of preparation and tailoring of properties. Desired monolith functionality is usually obtained by post-polymerization modification, requiring multiple steps for immobilization that impact repeatability of column performance and also extend column preparation time, both of which are undesirable for large-scale production.

Several groups have reported preparation of functionalized monoliths in a single step [13] or one-pot [14,15] approach that avoids time-consuming surface modification processes. Hybrid organic-inorganic monoliths with chiral selectors like β-cyclodextrin [15] and vancomycin [13] have been prepared. These monoliths showed superior performance compared to traditional ones formed in a two-step process involving copolymerization using a monomer linked to a functional molecule.

Acrydite-modified DNA has been previously used in the preparation of polyacrylamide for gel and capillary electrophoresis by grafting [16] or polymer entangling [17], reducing preparation steps. The mechanical properties of these gels, however, severely limit their applicability for capturing of target nucleic acids. Indeed, only electrophoretic operation is possible due to the mechanical properties and pore size of these gels, which also may break down under extended operation [16]. Moreover, electrokinetic injection also loads only a fraction of sample on the gel and is sensitive to solution conductivity.

The applicability of porous polymer monoliths prepared in microfluidic channels and modified with oligonucleotides using the Schiff-base method, for sequence-specific capture of complementary oligonucleotides has been demonstrated [18].

There is a particular need for high performance, inexpensive, mass produced polymer monoliths for determining Carbapenem resistance. Carbapenem resistance among Enterobacteriaceae, mainly in *Klebsiella pneumoniae* and *Escherichia coli*, is becoming a severe threat globally, and has already been detected in multiple outbreaks [1,2]. Several resistance mechanisms have been reported to circumvent the efficacy of carbapenem antibiotics; a common mechanism of carbapenem resistance is through class-A, *Klebsiella pneumoniae* carbapenemase (KPC). The KPC enzyme confers resistance to all beta lactam agents including penicillins, cephalosporins, monobactams, and carbapenems [3,4]. The $bla_{KPC}$ genes that encode KPC are present on transferable plasmids, such that the gene can freely move from plasmid to the bacterial chromosome and back [5].

The current strategy for determination of antibiotic resistance relies on blood culture. Although this provides complete information about the resistance profile, it usually takes 24-48 hours, which poorly matches the urgent need for rapid, appropriate treatment in sepsis [4]. Confirmatory testing for KPC-producing bacteria is recommended in geographical locations where Enterobacteriaceae are noted to have decreased susceptibility to carbapenems, and confirmation of KPC production requires molecular methods such as PCR [1,5]. Although PCR provides fast and sensitive detection of pathogens, it requires extensive sample processing to avoid contamination or interferences present in blood or cultured bacteria, any of which may yield false-negative results [6].

SUMMARY

An aspect is a method for creating a monolith in a void space of a microfluidic device. The internal void spaces of the monolith are filled with a polymerization mixture comprising one or more photopolymerizable monomers, a photo initiator, and a capture affinity element. The polymerizable mixture may be any suitable photopolymerization system, for example it may include one or more photopolymerizable acrylate monomers such as PEGDA and EDMA.

The device is then masked to prevent light from reaching the internal void spaces with the exception of a gap to allow light to reach a preselected portion of the void spaces. The device is then exposed to light to polymerize polymerization solution in the preselected portion to form in the preselected portion a porous polymer monolith. Depending upon the polymerizable mixture, the light may be any suitable wavelength, including visible and UV light.

The polymerization creates a monolith that has a capture affinity element, such as an oligonucleotide, on its surface. The polymer monolith is anchored on a device surface within the preselected portion.

Unpolymerized polymerization solution is then rinsed from the internal void spaces. To form a monolith with a capture surface, only this polymerization is required without further treatment, thus this is basically a one step method when compared with methods requiring iteration of processes or treatment after formation.

The capture affinity element may be a capture oligonucleotide, which may be complementary to a target DNA sequence, such as a sequence from a gene of a microorganism, like a bacterium. The capture oligonucleotide may also be complementary to a target from an antibiotic resistance gene, such as the KPC gene, or NDM gene, or VIM gene.

The present method may be applied to any suitable microfluidic device with an internal network of voids. The preselected void for the monolith may be a channel or any other suitable construction.

The present method can be used to create a device for immobilizing a molecule complementary to the capture affinity element, by directing in the microfluidic device fluid through the porous monolith. According, the device can incorporate elements, or be used with other devices for PCR analysis, detection of molecules that are complementary to the affinity capture element. In general a monolith may be designed to capture any molecule that has a suitable affinity capture element that can incorporated into a polymerizable mixture and be on the surface of a monolith created from the mixture.

Here is disclosed a single-step fabrication of monoliths functionalized with a capture oligonucleotide in a microfluidic device. Exemplary monolithic columns were integrated with a denaturing section on a device for processing of dsDNA and used for capture of target DNA followed by on-chip fluorescent labeling. A dsDNA target from the KPC antibiotic resistance gene was captured, labeled, eluted and detected both in buffer and in bacterial lysate isolated from a blood sample. The fluorescence detection setup utilized here was sufficient to characterize monolith properties. Monoliths are intended for eventual integration into a complete clinical diagnostic package. Such a system can be combined two additional technologies for: upstream extraction of bacteria from blood using rapid centrifugal processing [19,20], and downstream single-molecule fluorescent counting using optofluidic waveguides [21].

Also disclosed herein is a single-step process for creating porous polymer monoliths for DNA extraction. This approach makes it easier for large-scale construction of capture supports for DNA, for example in microfluidic devices. It has been demonstrated their use for selective extraction of DNA related to sepsis. These monoliths should be useful for a wide range of experiments where sequence-selective capture of DNA is needed.

The present approach has two main advantages. (1) monoliths having a threefold higher DNA binding capacity than ones made by the slower, conventional multistep process. (2) columns made in a single-step process that is amenable to large-scale fabrication of many devices in parallel for DNA extraction.

A procedure was developed for single-step fabrication (in a fluidic microdevice) of a porous polymer monolith having a capture DNA sequence. Columns prepared by the present single-step method had threefold higher binding capacity compared to DNA capture monoliths prepared by the Schiff-base method. Using the present developed procedure, it is possible to prepare a DNA capture monolith anchored to the channel wall using a single UV exposure step. This approach allows fast and easy column fabrication with the possibility of scalable production.

The applicability of the present monoliths in selective capture of targets containing a complementary sequence to the immobilized capture oligonucleotide was demonstrated by actual examples. Conditions were optimized for denaturing, capture and labeling using a synthetic 90-mer oligonucleotide. It was found that a hybridization temperature of 40° C. improved capture efficiency by 40% over room temperature. Using a fluorescent hybridization probe, captured target was labeled with 97% efficiency. In order to enable capture of target from dsDNA, a denaturing section was implemented on the device, and with the heater set to 90° C., the capture efficiency for denatured dsDNA was excellent, at 86% of a ssDNA target.

The present method was applied for extraction of dsDNA related to the KPC antibiotic resistance gene in bacterial lysate purified from a whole blood sample spiked with *E. coli*. It was found that the extraction of the KPC amplicon from bacterial lysate and hybridization buffer had essentially the same eluted peak area, results that were confirmed by real-time qPCR analysis of eluted fractions collected from the device. Although amplicon recovery was low at 2.5% for 50 µL of sample processed in 18 minutes, previous work shows that recovery improves to >80% for lower (1 pM) target concentrations [18]. To improve detection at such low levels future integration of the present microdevices with an optofluidic microchip for single-molecule counting [21] should facilitate detection of clinically relevant target concentrations.

Fast determination of antibiotic resistance is crucial in selecting appropriate treatment for sepsis patients, but current methods based on culture are time consuming. The present system is applicable to a microfluidic platform with a monolithic column modified with oligonucleotides designed for sequence-specific capture of target DNA related to the *Klebsiella pneumoniae* carbapenemase (KPC) gene. Using the present single-step monolith fabrication method with an acrydite-modified capture oligonucleotide in the polymerization mixture, fast monolith preparation in a microfluidic channel using UV photopolymerization was enabled. The present prepared columns had a threefold higher capacity compared to monoliths prepared in a multistep process involving Schiff-base DNA attachment. Conditions for denaturing, capture and fluorescence labeling using hybridization probes were optimized with synthetic 90-mer oligonucleotides. These procedures were applied for extraction of a PCR amplicon from the KPC antibiotic resistance gene in bacterial lysate obtained from a blood sample spiked with *E. coli*. The results showed similar eluted peak areas for KPC amplicon extracted from either hybridization buffer or bacterial lysate. Selective extraction of the KPC DNA was verified by real time PCR on eluted fractions. These results show great promise for application in an integrated microfluidic diagnostic system that combines upstream blood sample preparation and downstream single-molecule counting detection.

DETAILED DESCRIPTION

Materials and Methods

1. Chemicals

Tris hydrochloride, Tris base, sulfuric acid, sodium hydroxide, sodium dodecylsulfate, sodium bicarbonate, ethylenediaminetetraacetic acid (EDTA), sodium chloride, magnesium chloride, sodium periodate, glycidyl methacrylate (GMA), ethylene glycol dimethacrylate (EDMA), poly (ethyleneglycol) diacrylate (PEGDA, MW 575), 2-hydroxyethyl methacrylate (HEMA), 1-propanol, n-dodecanol, 1,4-butanediol, benzoin methyl ether (BME), guanidine hydrochloride, sodium cyanoborohydride, 2-propanol and ethanol were obtained from Sigma-Aldrich (St. Louis, Mo.), Merck (Darmstadt, Germany) or Fisher Scientific (Pittsburgh, Pa.). SYBR Green II and Quant-iT OliGreen were obtained from ThermoFisher Scientific (Waltham, Mass.). All chemicals were analytical grade purity or higher.

2. Sequence Design Methods

For extracting and detecting DNA sequences associated with antibiotic resistance, the KPC gene was selected. The capture sequence was designed by querying GenBank (National Center for Biotechnology Information, NIH) for coding sequences for the KPC gene. At least 50 sequences were downloaded and analyzed using the MUSCLE algorithm for multiple sequence alignment in MEGA 5.1 (Molecular Evolutionary Genetics Analysis). A consensus sequence for the gene was constructed and used for capture and labeling probe sequence design using PrimerQuest (Integrated DNA Technologies, Coralville, Iowa). The putative capture sequence was evaluated for optimum theoretical sensitivity and specificity using BLAST (National Center for Biotechnology Information, NIH). The oligonucleotides used in these experiments (see Table 1) were obtained from Eurofins Scientific (Louisville, Ky.)

3. Device and Monolith Fabrication

Figure 1A:
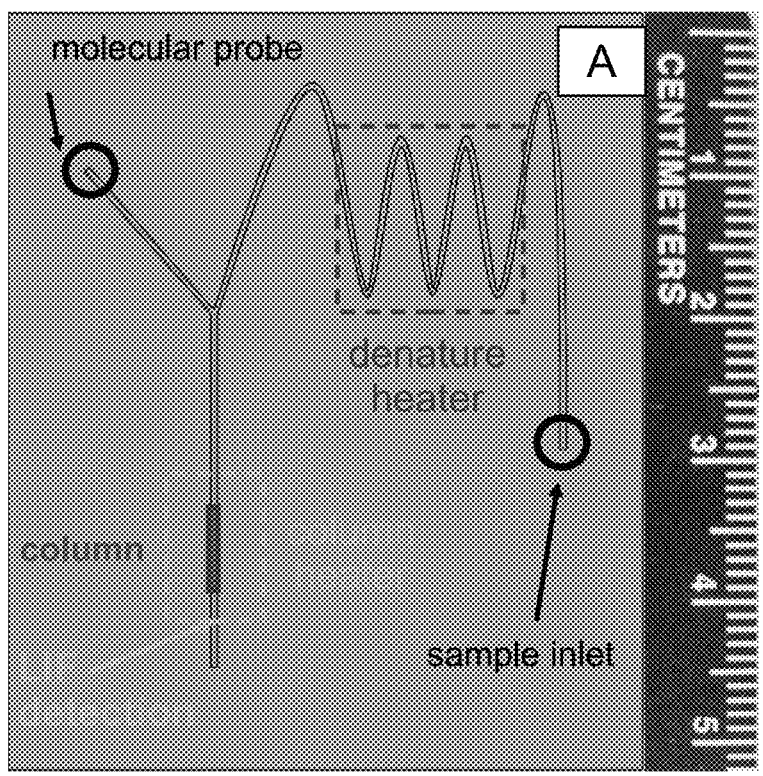
FIG. 1A. Microfluidic device—Schematic indicating inlets, placement of heaters and LIF detection point.

Fluidic microdevices with the design shown in FIG. 1A were prepared by a hot embossing method to transfer the channel features (500 µm wide×500 µm tall) using custom made from CNC machined aluminum masters and black polypropylene sheets (2 mm thick) used in a commercial sepsis diagnostic system (Great Basin Corp., Salt Lake City, Utah). Next, holes were drilled for channel inlets and outlets, followed by thermal sealing of the channels with a transparent polypropylene film (0.5 mm thick, Great Basin Corp.).

Figure 1B:
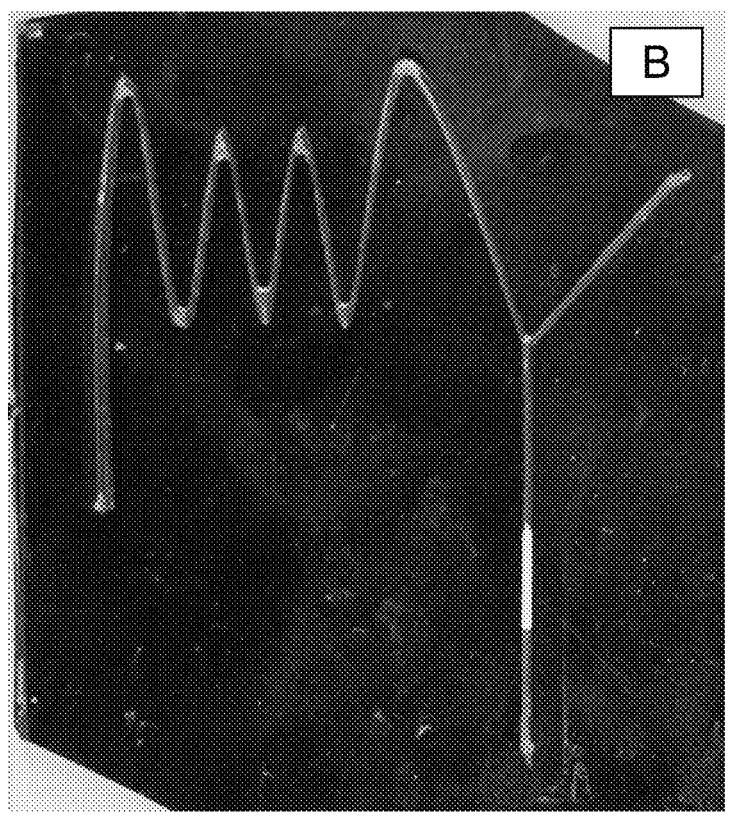
FIG. 1B. Microfluidic device—Photograph of a microfluidic device made from black polypropylene having a porous polymer column.

Monoliths fabricated by the single-step method were prepared by filling a device with polymerization mixture containing 18.5% poly(ethylene glycol) diacrylate (PEGDA), 18.5% ethylene glycol dimethacrylate (EDMA), 14% 2-propanol, 41.5% n-dodecanol, 4.5% 500 µM acrd-KPC (in 1:1 2-propanol:water) and 3% BME photoinitiator (all w/w). The device was masked using black tape leaving a 5 mm gap close to the device outlet and exposed to UV light using a SunRay 600 UV lamp (Uvitron International, West Springfield, Mass.) for 12 min at 100 mW/cm$^2$. After the polymerization step, the device was rinsed with 2-propanol for 15 min and water for 10 min. A photograph of a finished device after monolith formation is given in FIG. 1B.

For comparative Schiff-base immobilization of DNA, the monolith was fabricated as described in [18]. In brief, the device was filled with a polymerization mixture containing 24% GMA, 16% PEGDA, 40% 1-propanol and 20% 1,4-butanediol with 3% BME photoinitiator (all w/w). The microfluidic device was exposed to UV light as described above, and rinsed with 2-propanol and water. The monolith was treated with sulfuric acid (0.5 M, 24 h) followed by sodium periodate (0.1 M, 12 h) in order to immobilize amine-terminated capture probe ($NH_2$-KPC).

Scanning electron microscopy (SEM) images of monoliths and devices were taken using a Phillips XL30 environmental scanning electron microscope (Hillsboro, Oreg.).

4. Lysis of Bacteria

The bacterial lysate was obtained from a bacteria-spiked blood sample following a previously published procedure [19,20]. In brief, 8 mL of whole blood (obtained from healthy human donors via an IRB-approved protocol) was spiked with 100 µL of diluted *E. coli*, producing a concentration of ~$10^6$ CFU/mL; 7 mL of bacteria-spiked blood was then pipetted into a hollow spinning disk. After a sedimentation process with controlled rotation of the disk, the cell-free plasma layer with concentrated bacteria was collected. Bacteria were lysed using 6 M guanidine HCl and 0.5% (w/v) SDS in 10 mM Tris-HCl for 5 minutes at room temperature, and then DNA was extracted using silica-coated superparamagnetic beads (Spherotech, Lake Forest, Ill.). Beads were collected using a magnet, washed with a solution containing 4 M guanidine HCl, 20 mM Tris-HCl and 40% 2-propanol, and eluted into 100 µL of hybridization buffer.

5. Device Operation and Instrumental Setup

The setup used is the same setup as in reference [18]. Briefly, monolith-modified devices were connected to a Fluigent (Lowell, Mass.) pressure-driven pumping and valving system. A flow rate of 15 µL/min was used, requiring 2 bar of pressure from the pump. Heating of the monolith section of the device was performed with a thermoelectric module (TE-23-1.0-1.3P, TE Technology, Traverse City, Mich.) operated by a temperature controller (TC-48-20, TE Technology) and equipped with control thermistors (MP-2444, TE Technology). Device temperature was approximated from the previously observed difference between the heater thermistor temperature and a thermistor on the opposite side of the device [18]. The confocal laser-induced fluorescence setup probed a point 2 mm beyond the monolith as described in prior publications [18,22] and shown in FIG. 1A. Hybridization buffer was 20 mM Tris-HCl pH 8 with 500 mM NaCl and 50 mM $MgCl_2$. Double-stranded FI-KPC was prepared by mixing 1:2 FI-KPC and comp-KPC and incubating at 50° C. for 15 min.

6 Supplementary Materials and Methods

DNA Extraction from Bacterial Lysate

The following solutions were used during DNA extraction; all reagents were acquired from Sigma Aldrich (St. Louis, Mo.). TE buffer: 10 mM Tris-HCl (pH 8.0) and 1 mM EDTA. Lysis solution: 6 M guanidine HCl, 0.5% (w/v) SDS, and 10 mM Tris-HCl. Washing solution: 4 M guanidine HCl, 20 mM Tris-HCl and 40% 2-propanol.

The filtered bacteria solution was centrifuged at 8000×g for 10 minutes, resuspended in 200 μL of TE buffer and transferred by pipette to a sterile microcentrifuge tube. Then, 400 μL of the lysis solution was mixed with bacterial suspension and vortexed for 30 seconds. The mixture was allowed to incubate for 5 minutes at room temperature. Then, 50 μL of silica-coated superparamagnetic beads (Spherotech, Lake Forest, Ill.) were added to the mixture and vortexed for 30 seconds. A magnet was applied to one side of the microcentrifuge tube and the supernatant removed by pipette and discarded. Then 500 μL of the wash solution was added and the magnet removed. The tube was vortexed for 15 seconds and allowed to incubate for 1 min at room temperature after being vortexed. The magnet was reapplied and the supernatant removed and discarded. The magnet was then removed and the beads were then allowed to air dry for 5 min. Then, 100 μL of hybridization buffer (20 mM Tris-HCl pH 8 with 500 mM NaCl and 50 mM $MgCl_2$) was added and the mixture vortexed for 2 min and allowed to incubate for 1 additional minute at room temperature. The magnet was reapplied and the supernatant removed for further processing and measurement.

The extracted DNA was then quantitated by fluorometry. Following the Quant-iT Picogreen assay protocol (ThermoFisher Scientific, Waltham, Mass.) and using a 600 μL PCR tube (Axygen, Fisher Scientific, Pittsburgh, Pa.), 5 μL of the extracted DNA was mixed with 95 μL of TE buffer followed by the addition of 100 μL of Picogreen and the mixture briefly vortexed. The tube was then placed in a TBS-300 fluorometer (Turner BioSystems, Sunnyvale, Calif.) and the fluorescence intensity read. The concentration of dsDNA (ng/μL) was determined using a calibrated Picogreen standard, which correlates the concentration of dsDNA with fluorescence intensity.

Amplicon Preparation from Bacterial Isolates

The bacterial isolate used in this study was acquired from the Centers for Disease Control and Prevention (CDC). The isolate was grown on Luria-Bertani agar at 37° C. for 18-24 hours prior to DNA extraction. Total genomic DNA was extracted from each isolate by suspending cells grown on Luria-Bertani agar plates in 510 μL of TE buffer containing 1.8 μg/μL lysozyme, and incubating for 45 minutes at 37° C. To this tube, 540 μL of bacterial lysis buffer and 100 μL proteinase K were added, after which it was incubated for 10 minutes at 65° C. followed by an automated DNA extraction performed with a Roche MagNa Pure LC system (Roche Diagnostics), using the Roche MagNa Pure LC DNA Isolate Kit III as recommended by the manufacturer. DNA was tested for biological growth by plating 10% of DNA sample volume on Luria-Bertani agar at 37° C. for 3 days. When DNA samples passed sterility, DNA concentrations were measured with a TBS-380 Fluorometer (Promega) using the Quant-iT PicoGreen dsDNA assay kit P7589 (Invitrogen).

DNA sequences unique to *K. pneumoniae* containing the carbapenemase gene *K. pneumoniae* carbapenemase (KPC) were obtained from NCBI Genbank (http://www.ncbi.nlm.nih.gov/genbank). The gene was analyzed and only part of the gene was used to create a ~250 bp amplicon. The primers were designed using PrimerQuest algorithms from Integrated DNA Technologies (IDT). (http://www.idtdna.com/primerquest/Home/Index). The primer sequences were selected for the proper GC content, optimal annealing temperatures, and lack of hairpin structures (see Table S1). Sanger sequencing was also done to confirm that the correct portion of the gene was amplified with the primers.

PCR Reaction and KPC Amplicon

Extracted bacterial DNA was amplified using PCR. Parameters were optimized by looking at the number of cycles, cycle temperatures and the length of annealing and elongation steps. A total reaction volume of 25 μL was prepared with the following: 13 μL of 1×AmpliTaq Gold 360 Master Mix (Applied Biosystems), 3 μL of target DNA, forward and reverse primers at 500 nM and PCR $H_2O$ to 25 μL. The PCR was performed using a ProFlex PCR System (Applied Biosystems). The optimized procedure used for PCR was 95° C. initial denaturation for 120 s followed by 40 cycles of 95° C. for 15 s, then 58° C. for 30 s, followed by 72° C. for 180 s. The PCR product was run on an agarose gel to confirm amplicon size. PCR product was quantified using a NanoDrop absorbance spectrometer (ThermoFisher Scientific.

Real-Time PCR Reactions

Parameters for qPCR such as the number of cycles, cycle temperatures, and length of annealing were all optimized. Primers were first evaluated with SYBR Green to optimize cycle temperatures and times. For every reaction, a master mix of 25 μL was prepared using 2×SYBR Select Master Mix (Applied Biosystems) and the following: forward and reverse primers at 500 nM, 3 μL target DNA, 13 μL SYBR Green at 2×concentration and PCR $H_2O$ to 25 μL. The mixtures were loaded into 25 μL Cepheid PCR tubes, and PCR was performed using a SmartCycler II (Cepheid). The optimized procedure identified and used for the assay was 95° C. initial denaturation for 120 s followed by 40 cycles of 95° C. for 15 s, then 58° C. for 30 s. These reactions were also carried out using an ABI 7900HT (Applied Biosystems) and 96 well plates. The reaction amounts and PCR conditions for the ABI were the same as for the SmartCycler II.

Results and Discussion

1. Single-Step Fabrication of Monoliths with a Capture Sequence

Several factors were considered in developing a procedure for single-step preparation of monoliths with a capture DNA sequence. Previously published single-step methods for preparation of porous polymers with copolymerized functionalities were based on hybrid organic-inorganic monoliths [13,14]. These monoliths are prepared by a sol-gel process that usually requires hours to prepare a column [13,14], which is not suitable for fast fabrication of a column in a disposable device. Therefore, photoinitiated polymerization was chosen to prepare the monoliths.

For selecting the composition of the polymerization mixture, the most limiting factor is the solubility of DNA, which requires polar solvents to dissolve sufficient concentrations. A 1:1 mixture of 2-propanol:water was chosen as the solvent for acrd-KPC (500 μM). The presence of water in the polymerization mixture limits the choice of monomers and porogens that are miscible yet still provide a porous structure after polymerization. Based on previous studies [18,23, 24], it was decided to use PEGDA and HEMA together with acrd-KPC, dissolved in 1:1 2-propanol:water and n-dodecanol as porogenic solvents. However, unsatisfactory porosity was obtained using these components. In order to simplify the polymerization mixture, HEMA was omitted. An advantage of using only crosslinkers (PEGDA and EDMA) as the structural monomers is that polymerization kinetics for diacrylates are faster than those for monoacrylates [25], increasing the probability of localization of acrd-KPC on the polymer surface.

Use of polypropylene microfluidic channels presents a challenge with anchoring of monoliths. Previously it was found that a sufficient concentration of BME photoinitiator anchors the monolith to the channel wall in a single step without channel pretreatment [18]. When PEGDA alone was used as the structural monomer, the resulting monolith had poor anchoring due to shrinking after cleaning the monolith with 2-propanol. Therefore EDMA was introduced into the mixture in order to promote adhesion of the monolith to the polypropylene surface due to better wettability since EDMA is more hydrophobic than PEGDA. A 1:1 mixture of EDMA and PEGDA was found to provide the most reproducible results.

Figure 2A:
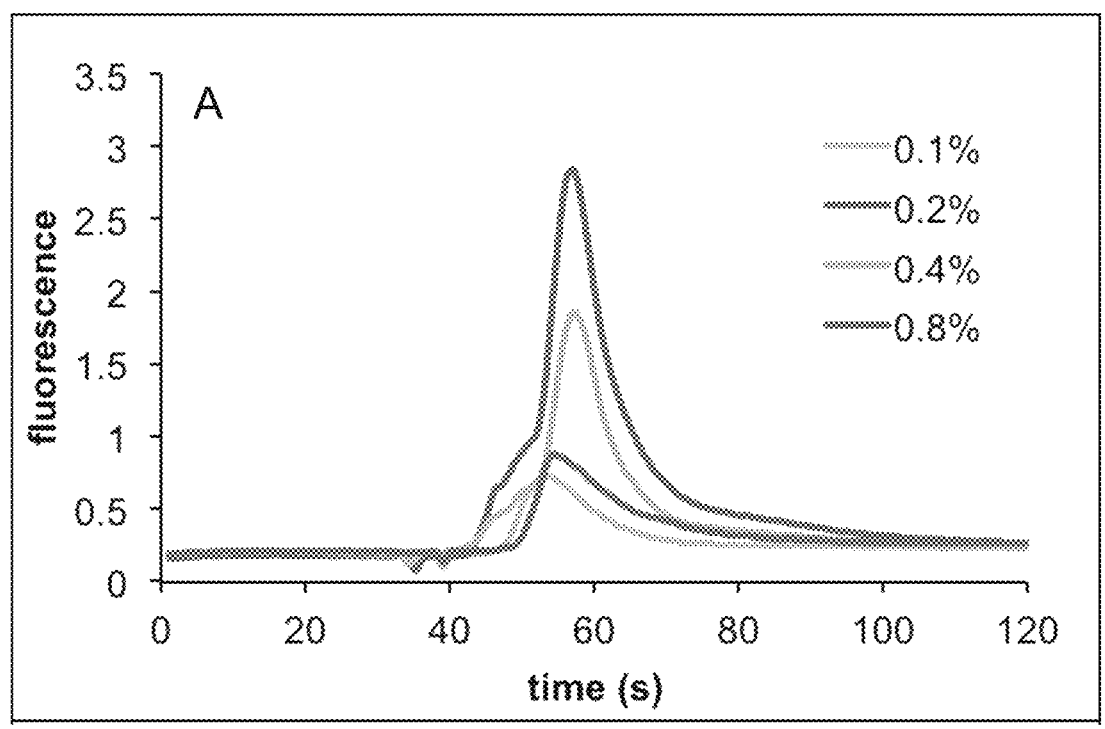
FIG. 2A. Column optimization—Elution traces of Fl-KPC extracted from 50 µL of a 1 nM solution using devices having porous polymer columns made with different amounts of acrd-KPC in the polymerization mixture.

The amount of capture sequence in the polymerization mixture was studied. FIG. 2A compares elution steps from columns with different amounts of acrd-KPC in the polymerization mixture, ranging from 0.1% to 0.8% (m/m). The results indicate that the amount of captured and eluted DNA from these columns is optimal with 0.2% acrd-KPC in the polymerization mixture. The smaller elution peak for 0.1% capture sequence corresponds to lower column capacity. Increasing the capture sequence amount to 0.4% or 0.8% likely makes the surface charge of the monolith too negative, hampering DNA hybridization and thus reducing the effective capacity of the column.

Figure 6A:
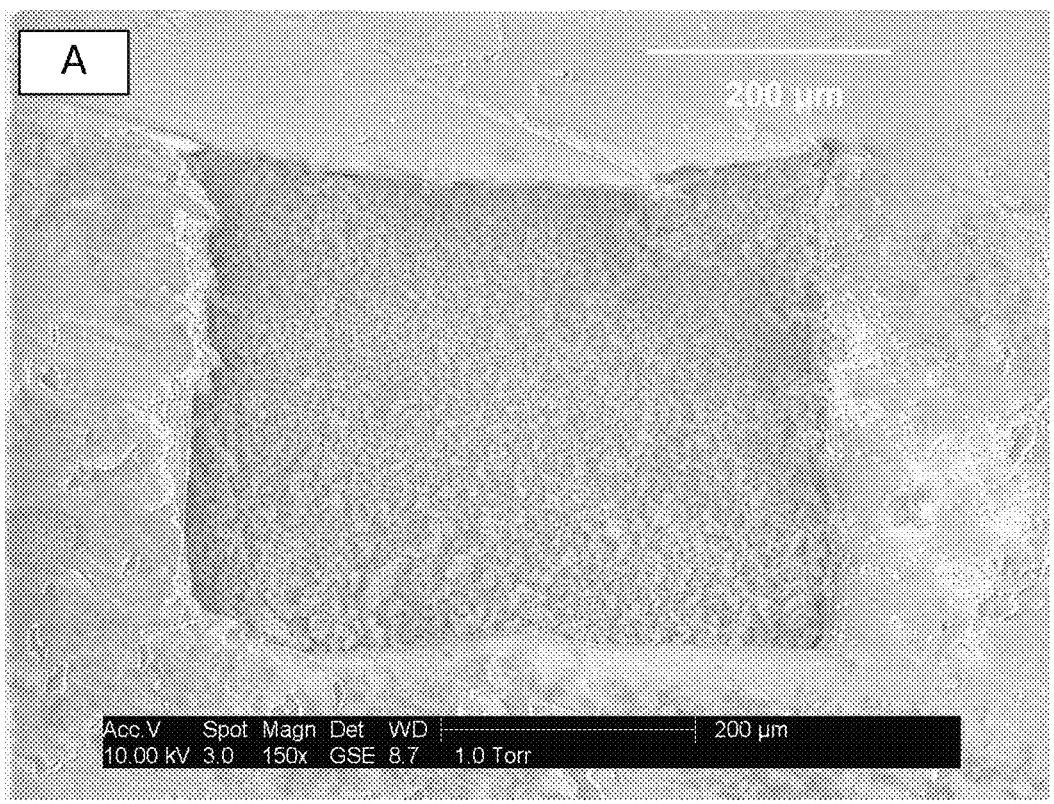
FIG. 6A. Scanning electron micrographs of columns prepared in microchannels. —Micrograph of full device cross-section.
Figure 6B:
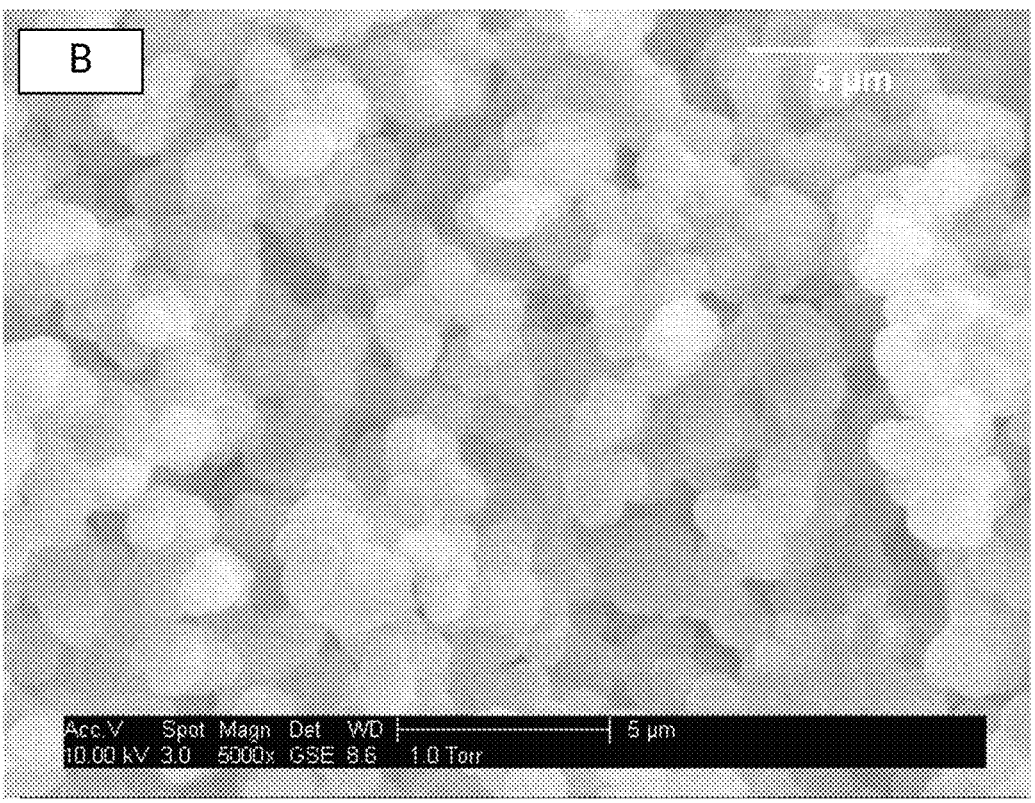
FIG. 6B. Scanning electron micrographs of columns prepared in microchannels. —Detailed view of the porous polymer morphology.

The final composition of the polymerization mixture for column preparation was 18.5% PEGDA, 18.5% EDMA, 14% 2-propanol, 41.5% n-dodecanol, 4.5% 500 μM acrd-KPC (in 1:12-propanol:water) and 3% BME. SEM images of monoliths in a microchip are shown in FIGS. 6A & 6B.

Figure 2B:
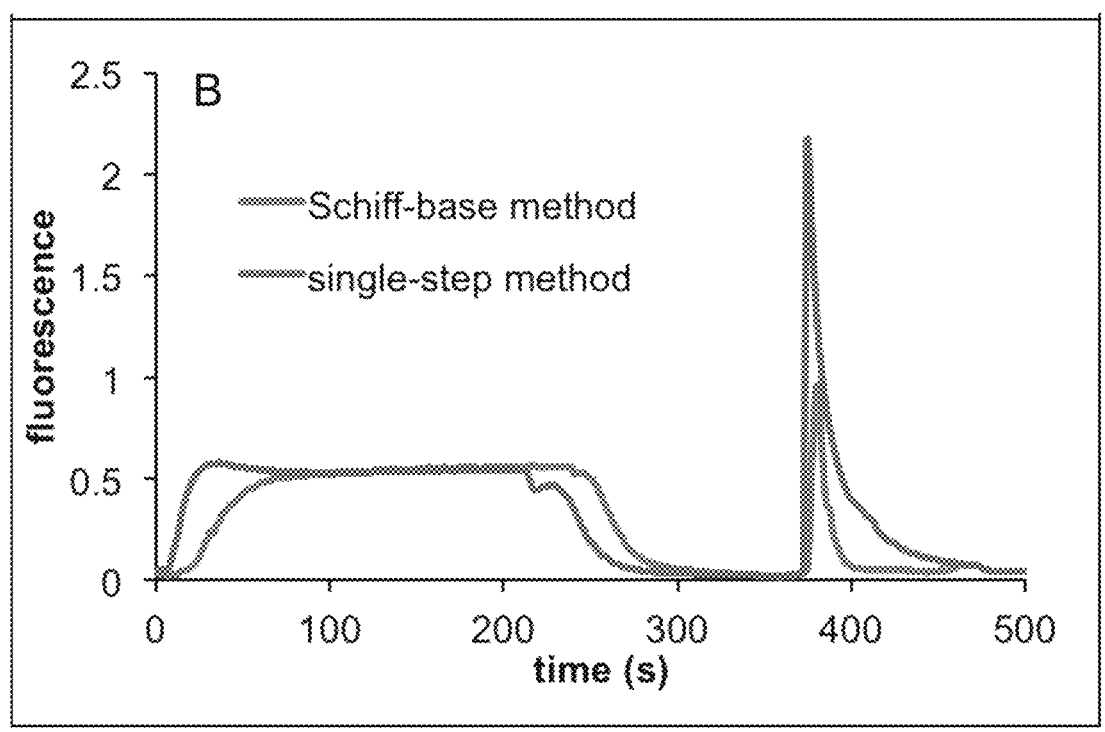
FIG. 2B. Column optimization—Comparison of eluted peaks for a single-step monolith and a monolith modified using the Schiff-base method; 50 µL of 5 nM Fl-KPC was loaded on each column.

Columns prepared by the single-step method and columns modified by the Schiff-base method were compared for binding capacity by extracting 5 nM FI-KPC, as shown in FIG. 2B. The Schiff-base modified column had a capacity of 21 fmol, and the single-step method's capacity was 66 fmol, more than a threefold improvement. The amount of acrd-KPC introduced in the polymerization mixture into the exposed part of the microfluidic channel was 25 pmol, indicating that only a fraction of the capture probe added to the polymerization mixture was sterically available for hybridization.

3.2. Optimizing Synthetic Oligonucleotide Capture and Capacity Testing

In previous work, capture and release of a short, 24-base complementary DNA strand to an immobilized capture sequence on the monolith was studied [18]. In order to capture clinically relevant DNA strands, a 90-mer, representing a longer synthetically available oligonucleotide was used for process optimization.

Figure 3:
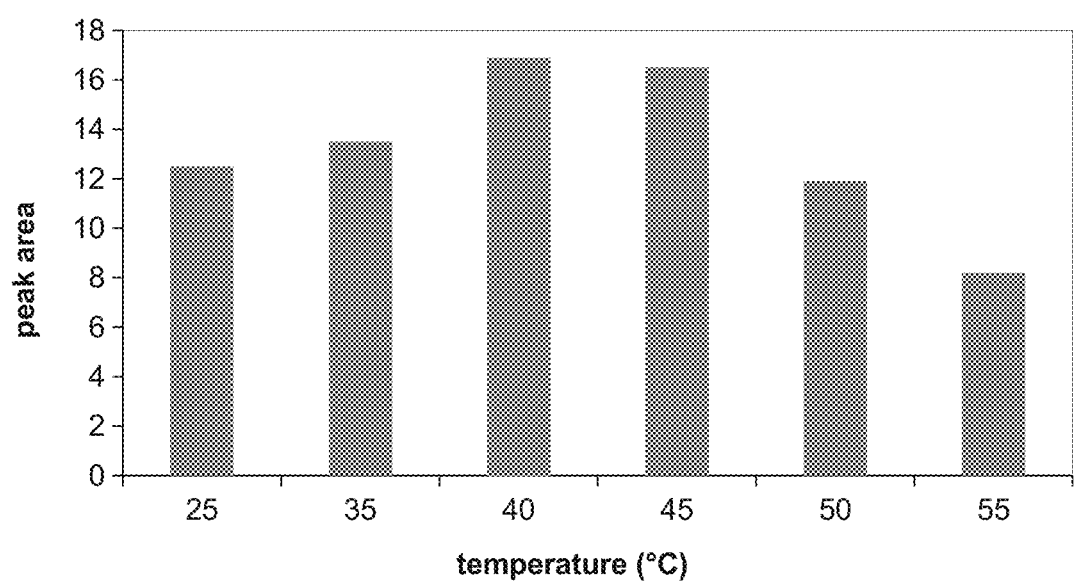
FIG. 3. Dependence of eluted peak area on hybridization temperature for loading of 50 µL of 1 nM Fl-KPC (n=3).

Temperature has been found to have a significant impact on DNA hybridization and its selectivity in microarrays [26,27]. Higher temperature reduces intramolecular binding and secondary structure that can limit successful hybridization to the capture sequence on the solid support. For testing the effects of temperature on capture efficiency, a previously used branched Y shape channel design [18] was utilized. FIG. 3 shows the dependence of the eluted peak area on the temperature of the heater placed over the monolithic column. About a 40% increase in the eluted peak area was observed for capture experiments at 40° C. compared to extraction at room temperature. At temperatures higher than 45° C., the capture efficiency decreased due to reduced base pairing as temperature got closer to the 68° C. melting point of the capture sequence and target.

3.3. On-chip DNA Labeling

Fluorescent labeling of DNA is the most common approach used for detection and sensitive quantification [28]. Some methods rely on dyes that become fluorescently active upon interaction with DNA, providing non-selective labeling, which is generally used for staining DNA in free solution or gels. Here was tested SYBR Green II and Quant-iT OliGreen for labeling of a 90-mer hybridized to the capture sequence on the monolith. Two different methods were tested: fluorescent dye was loaded and rinsed off the column, or dye was present in the buffer used in the elution step. With either approach unsatisfactory and poorly repeatable results were obtained, possibly due to weak interaction of the dyes with DNA at the high temperature (70° C.) used for elution.

Hybridization probes are another frequently used way to introduce fluorophores on a DNA sequence of interest; they provide selective labeling through hybridization to the target [28,29]. A standard design, called a molecular beacon (MB), consists of the 5' end modified with a fluorophore and the 3' end modified with a quencher matching the spectral properties of the fluorophore. The base sequence of the probe is designed with a stem structure bringing the fluorophore and quencher in close proximity, and making the system fluorescently inactive. Upon hybridization, the stem opens separating the fluorophore and quencher and enabling the fluorescent signal from the MB to be recorded [29].

Figure 4A:
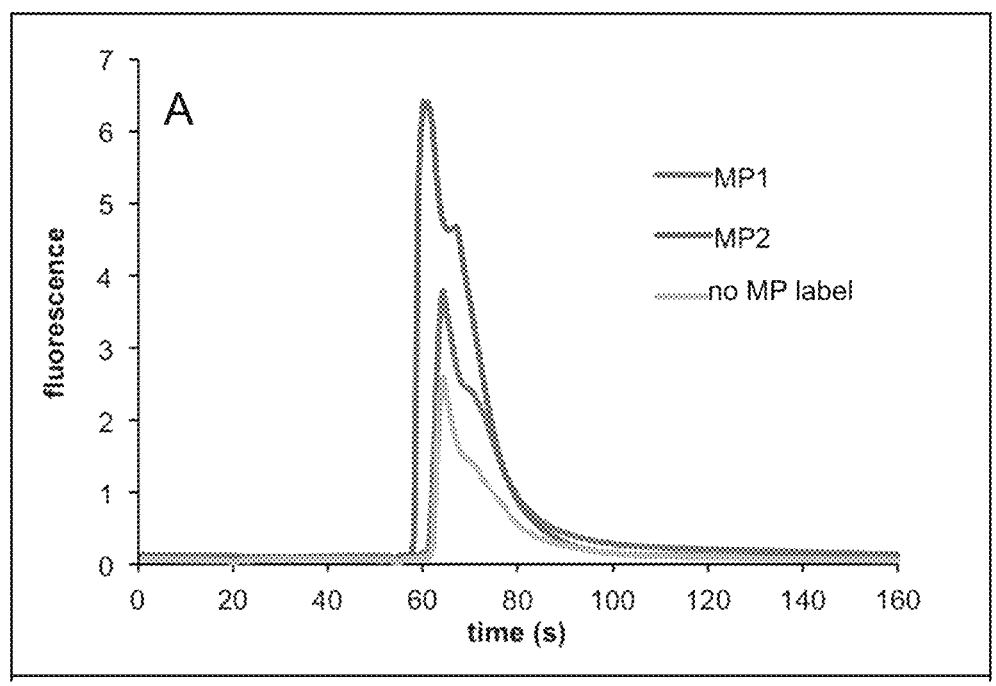
FIG. 4A. Labeling of 90-mers using hybridization probes. —Elution profiles of 1 nM Fl-KPC labeled with a hybridization probe having either 1 (MP1) or 2 (MP2) fluoresceins.

Similar to the capture sequence, a site for a hybridization probe was determined for selective labeling of the KPC gene (see Materials and methods, Section 2). When 50 μL of 100 nM hybridization probe with one fluorescein (MP1) was loaded on the monolith after capturing FI-KPC, an increase in signal was recorded in the elution peak over signal provided from just FI-KPC as shown in FIG. 4A. It was found that although unhybridized 100 nM MP1 in free solution had high fluorescence signal, it was possible to load 100 nM MP1 and rinse it from the monolith without observing any interfering peaks during elution (see blank, FIG. 4B).

The MP1 design was modified by removing the bases at each end responsible for stem formation and replaced BHQ1 with 6-FAM at the 3' end, resulting in a probe with 2 fluorophores (MP2). Testing MP2 under the same conditions as MP1 provided an increase in the observed signal of the eluted peak, as shown in FIG. 4A.

Figure 7A:
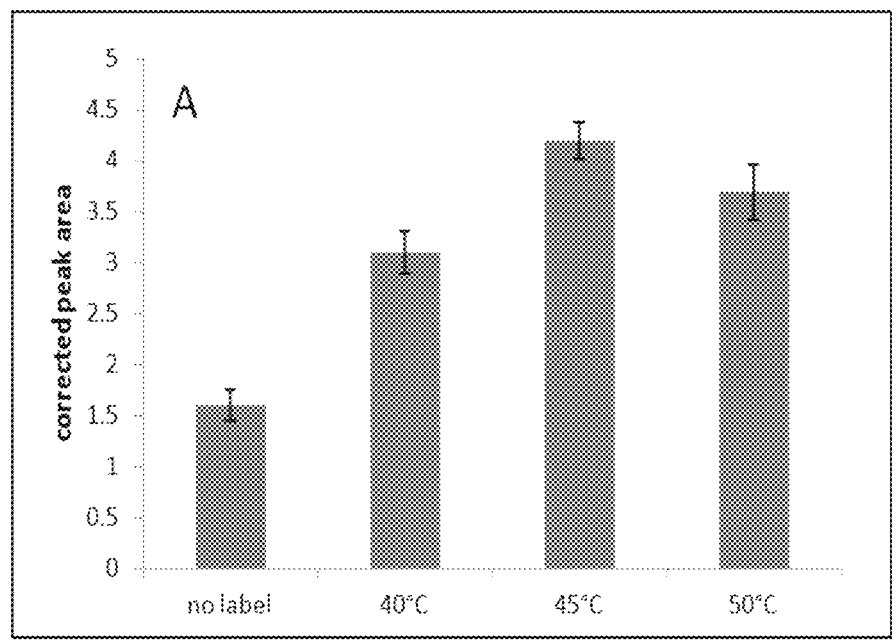
FIG. 7A. Optimization of labeling process. —Dependence of eluted peak areas on column heater temperature for 1 nM Fl-KPC labeled with 100 nM MP2.
Figure 7B:
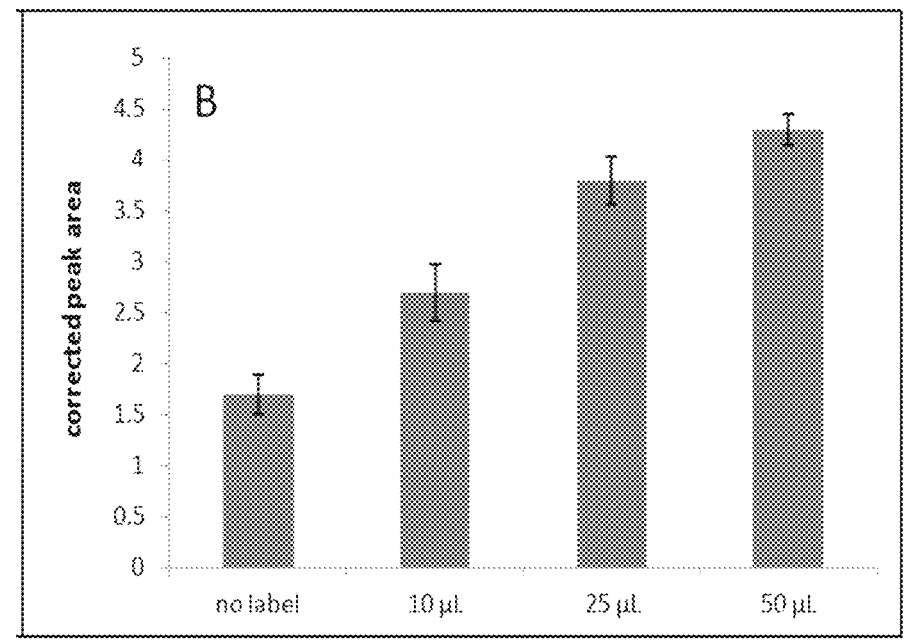
FIG. 7B Optimization of labeling process. —Dependence of eluted peak area for 1 nM Fl-KPC labeled with different volumes of 100 nM MP2. Temperature for the column heater was 45° C. Peak areas were corrected to account for the volume of the eluted peak.

The labeling process was optimized regarding probe hybridization temperature (see FIG. 7A) with the best results obtained with the column heater set at 45° C. Loaded MP2 volume showed an increased peak area that approached the theoretical maximum of a 3×signal increase at 50 μL of MP2. Using 50 μL of FI-KPC to quantify the amount of captured target with or without MP2 labeling, the labeling efficiency was determined as 97% for a 1 nM target concentration and 96% for a 100 pM target concentration. Using a larger volume than 50 μL or MP2 concentration higher than 100 nM would require a corresponding increase in rinse volume to more than 50 μL to completely remove non-hybridized MP2 and have a blank with no eluted signal. Such an approach would significantly extend the time of the procedure for only a slight increase in labeling efficiency, which is not ideal for the intended application of rapid sepsis diagnostics.

Figure 4B:
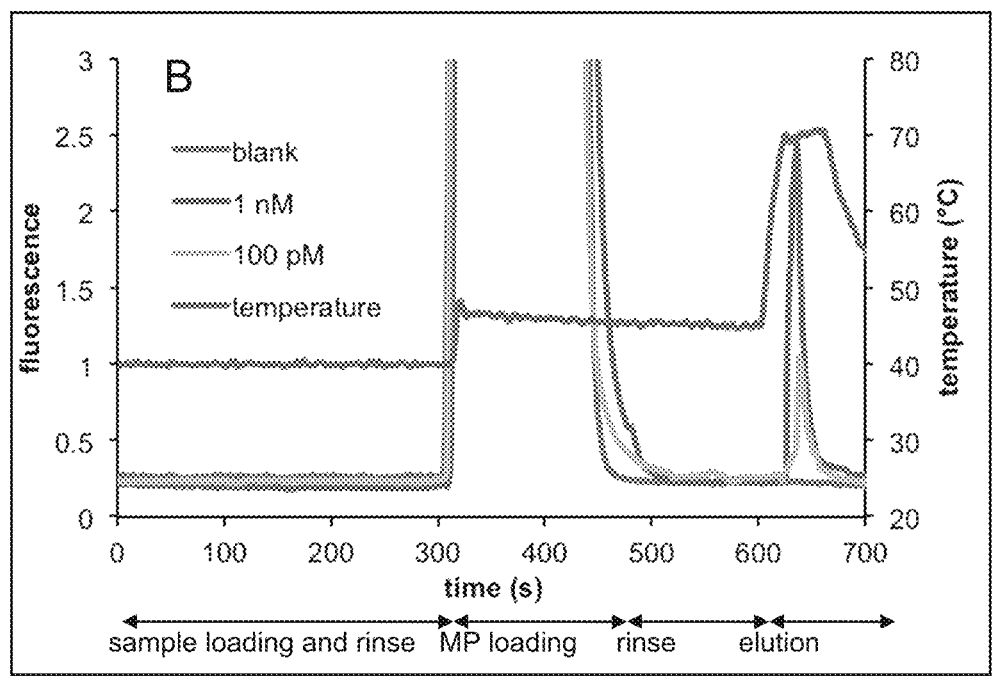
FIG. 4B. Labeling of 90-mers using hybridization probes. —Traces showing extraction of 50 µL of KPC and labeling with MP2 (100 nM, 50 µL).

MP2 labeling of 1 nM and 100 pM KPC oligo (unlabeled) was then used, and the fluorescence traces along with the temperature profile of the column heater during capture, labeling and elution are shown in FIG. 4B. The data show no fluorescent signal during the loading step, and a blank experiment after labeling with MP2 shows no peak in elution. The eluted peak area for the 1 nM oligo after labeling is about five times larger than that of the 100 pM sample. The difference from the expected linear increase can be attributed to better capture efficiency for the 100 pM sample. Higher capture efficiencies have previously been observed when working with lower concentrations of loaded DNA [18].

3.4. On-chip DNA Denaturing

Genomic DNA from bacteria involved in sepsis is typically present as dsDNA; denaturing is required to create ssDNA that can hybridize to the capture strands. DNA can be denatured chemically using low or high pH [30], chaotropic agents [31] or by raising the temperature higher than the melting point of the hybrid [32,33]. Because chemical denaturing creates conditions that are unsuitable for subsequent hybridization of target to the capture sequence, thermal denaturing was chosen for this example. On-chip DNA denaturing has been utilized in many applications including PCR [7,8,33] and DNA hybridization arrays [10,32]. Arrays have been successfully applied in detection and enrichment of nucleic acids; however, poor hybridization efficiency and long incubation times are drawbacks of microarrays. Back hybridization of target to its complement in solution was shown to be an important cause of low microarray efficiency [10]. Repeated sample recirculation in a closed loop through a denaturing chamber was demonstrated to improve efficiency [10]; however, this strategy is time consuming and requires additional pumping elements on the chip.

In order to implement denaturing capabilities in a microfluidic device, a design was used with a serpentine channel section having a 10 µL volume over which a denaturing heater was placed (FIG. 1A). The short transport time of 30 seconds for denatured DNA from the heated section to the monolithic column, and shorter (<3 second) monolith transit time minimizes renaturing of DNA, and hence increases the chance of capture of target ssDNA.

Figure 8A:
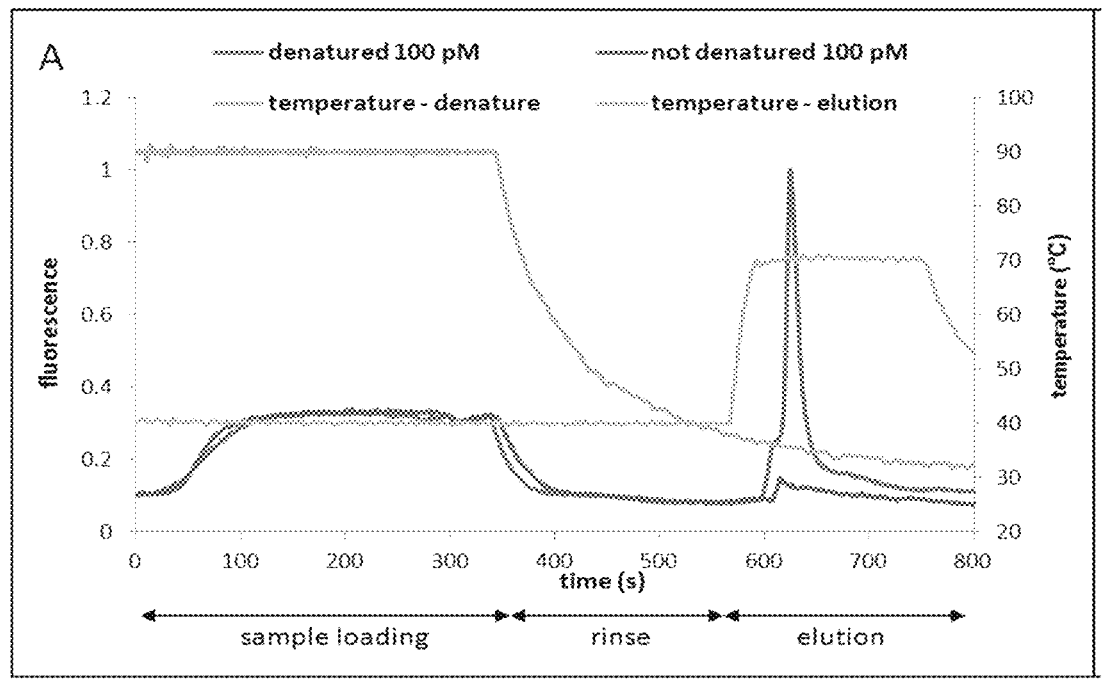
FIG. 8A. Denaturing of ds Fl-KPC. —Traces showing elution of 100 pM ds Fl-KPC loaded on the column with or without a 90° C. denaturing step FIG. 8B. Denaturing of ds Fl-KPC. —Elution of 100 pM ss and ds Fl-KPC.

Denaturing of dsDNA was tested on a synthetic 90-mer dsDNA with FI-KPC as one of the strands. 50 µL of 100 pM dsDNA was passed through the denaturing section of the channel and onto the column. Results are shown in FIG. 8A, demonstrating successful capture and elution of FI-KPC from the mixture when the denaturing heater was set to 90° C. With the denaturing heater off, the eluted peak was 15×smaller than with the heater on, which is attributed to incomplete hybridization of the FI-KPC with its complement.

Figure 8B:
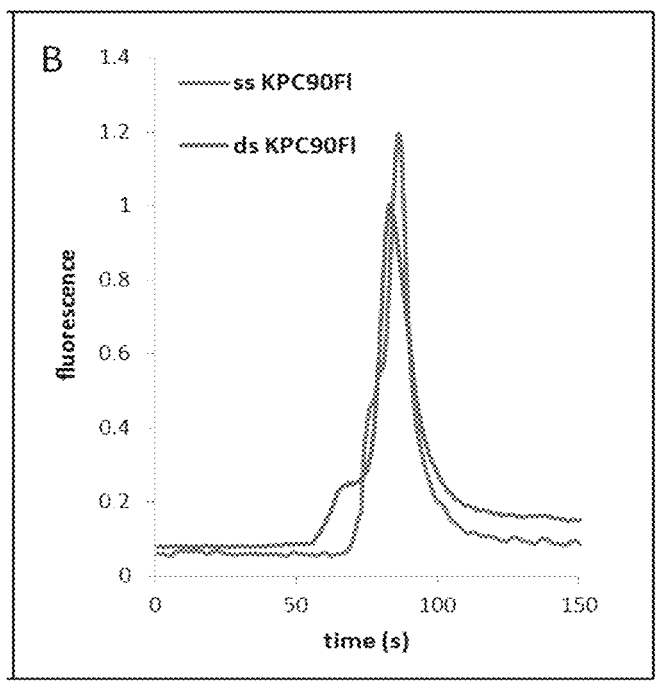

To determine the denaturing efficiency, single- and double-stranded FI-KPC (100 pM) were loaded through the denaturing section, onto the monolith, and then eluted. Comparing the areas of the eluted peaks in FIG. 8B, it was possible to capture 86% of the FI-KPC strand from dsDNA loading, compared to loading of single-stranded FI-KPC. This demonstrates effective thermal denaturing of a dsDNA target followed by capture on, and elution from the monolithic column in the present devices.

5. Capture and Labeling of dsDNA in Bacterial Lysate

Figure 9A:
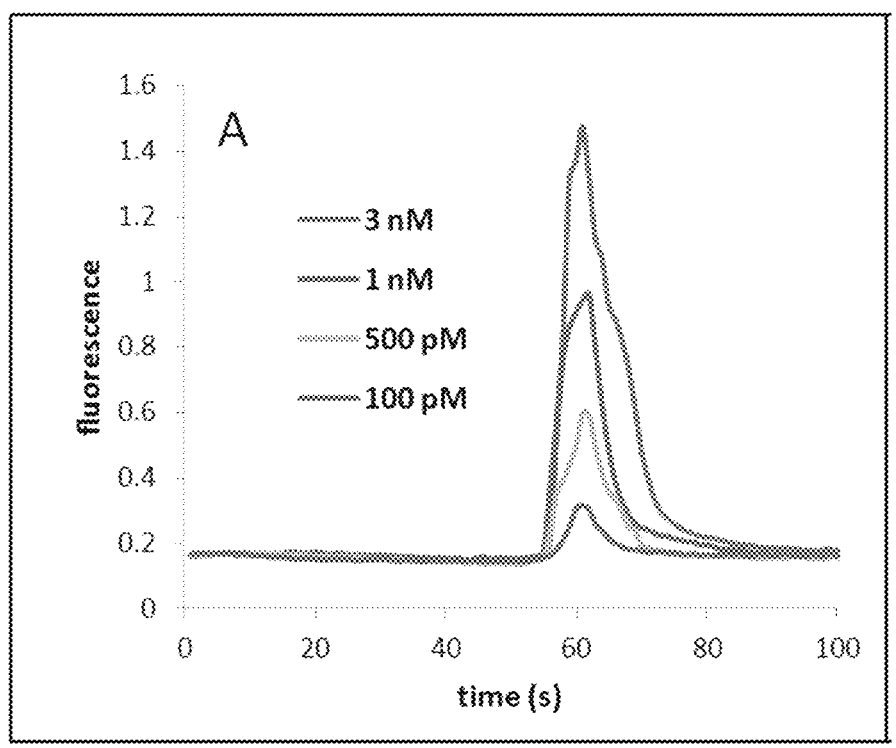
FIG. 9A. Elution of KPC amplicon. —Dependence of the eluted peak on the concentration of KPC amplicon in 50 µL of loaded sample.
Figure 9B:
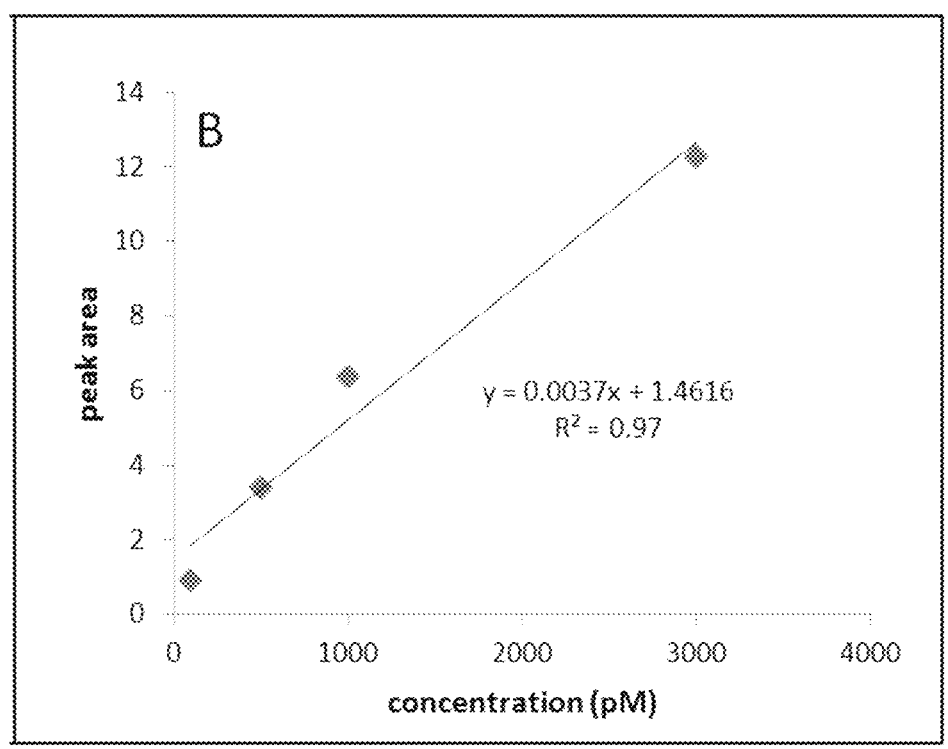
FIG. 9B. Elution of KPC amplicon. —Calibration curve for peak area with KPC amplicon concentration.

For testing the extraction and labeling process on a target that mimics clinical samples, a part of the KPC gene was PCR amplified in order to provide a controlled concentration of a longer dsDNA (see Section 6 in Materials and methods). Tested were KPC amplicons with concentrations from 100 pM to 3 nM for on-chip denaturing, capture and labeling. The elution traces are shown in FIG. 9A, with a lowest detected concentration of 100 pM using this LIF system, and the peak areas show good linearity with concentration, as seen in FIG. 9B. These experiments demonstrate the ability to process longer, sepsis-relevant dsDNA samples in the present devices; determining clinically relevant bacteria levels will require lower detection limits, such as those feasible with single-molecule counting systems [21]. A comparison of the eluted peak area of 1 nM KPC amplicon to that of 1 nM FI-KPC indicates that recovery of the amplicon was 2.5%, compared to 10% for FI-KPC. Low recoveries for both may be because the 50 fmol of target loaded is very close to the monolith binding capacity (66 fmol). The four-fold difference in recovery between amplicon and FI-KPC is attributed to the <100% efficiencies of the labeling and denaturing steps. Additionally, the overall lengths of the targets (250 vs. 90 bases) together with their different capture sequence hybridization site locations that may affect accessibility for monolith capture, could also limit recovery. As shown previously, recovery improves with lower concentration of target in the sample [18], indicating that it is possible to capture and elute target at significantly lower copy numbers (relevant to clinical samples), although detection using more powerful single-molecule counting systems [21] will likely be needed. Larger monolith cross sections could increase binding capacity and improve recovery, as could longer columns, but both would lead to larger eluted volumes that would slow down the extraction process.

Figure 5A:
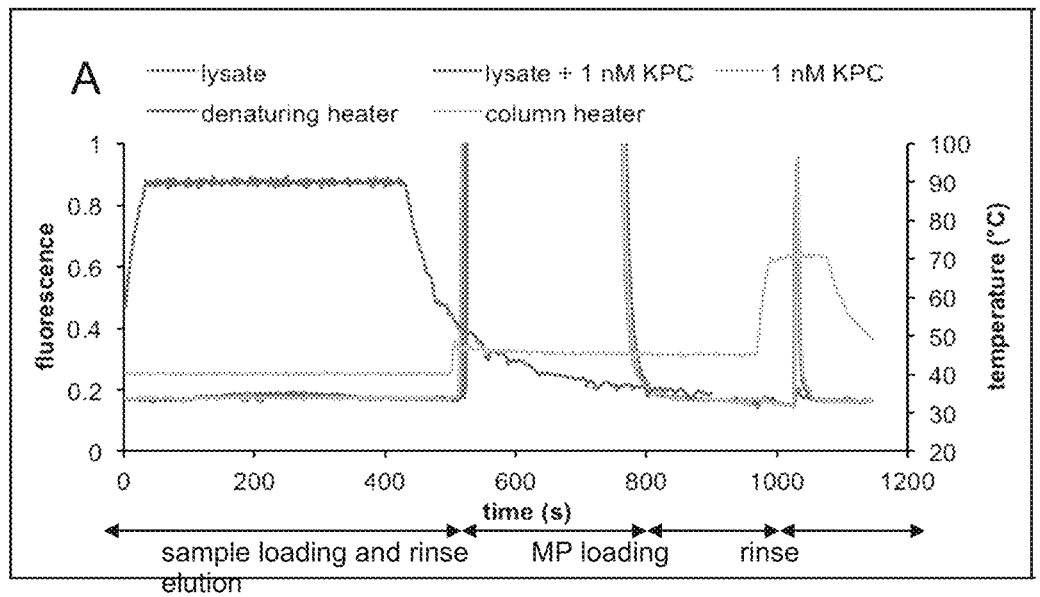
FIG. 5A. Extraction of KPC amplicon. —Traces for extraction, labeling and elution of bacterial lysate as well as 1 nM KPC amplicon in buffer and bacterial lysate. Temperature profiles are shown for both the denaturing and column heaters.
Figure 5B:
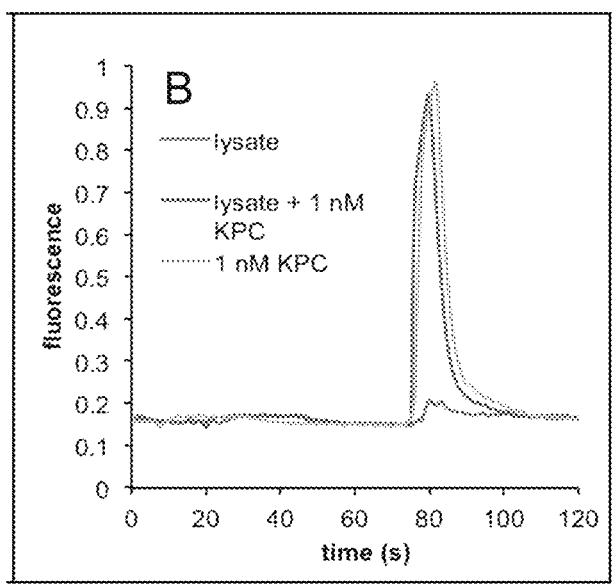
FIG. 5B. Extraction of KPC amplicon. —Zoom view of elution trace.

The present approach to detection of bacterial pathogens in blood involves treatment of the sample by separating and concentrating the bacteria [19,20], followed by lysis and DNA extraction (see Materials and methods, Section 4 for details). Purified DNA (0.4 ng/µL) from lysed bacteria was spiked with a PCR amplicon from the KPC gene and processed in the present microchip. DNA denaturation, capture of target and labeling with MP2 were done, and FIGS. 5A and 5B show fluorescence signals after elution from the monolith for KPC amplicon in hybridization buffer and bacterial lysate. Bacterial lysate lacking KPC amplicon was also analyzed. It was found that the eluted peak fluorescence was essentially the same for 1 nM KPC amplicon in hybridization buffer or bacterial lysate, showing that the complex sample matrix did not interfere with the present device results. Additionally, lysate lacking KPC amplicon showed a very small peak (50× lower area) than the 1 nM amplicon-spiked sample. This indicates the presence of a very low concentration of some unknown compound coming from the high concentration of bacteria added to the blood sample (~$10^6$ CFU/mL). Importantly, the present data show that it is possible to selectively extract, label and detect a sepsis-related antibiotic resistance gene sequence in a processed blood sample using the present microdevices.

Figure 10:
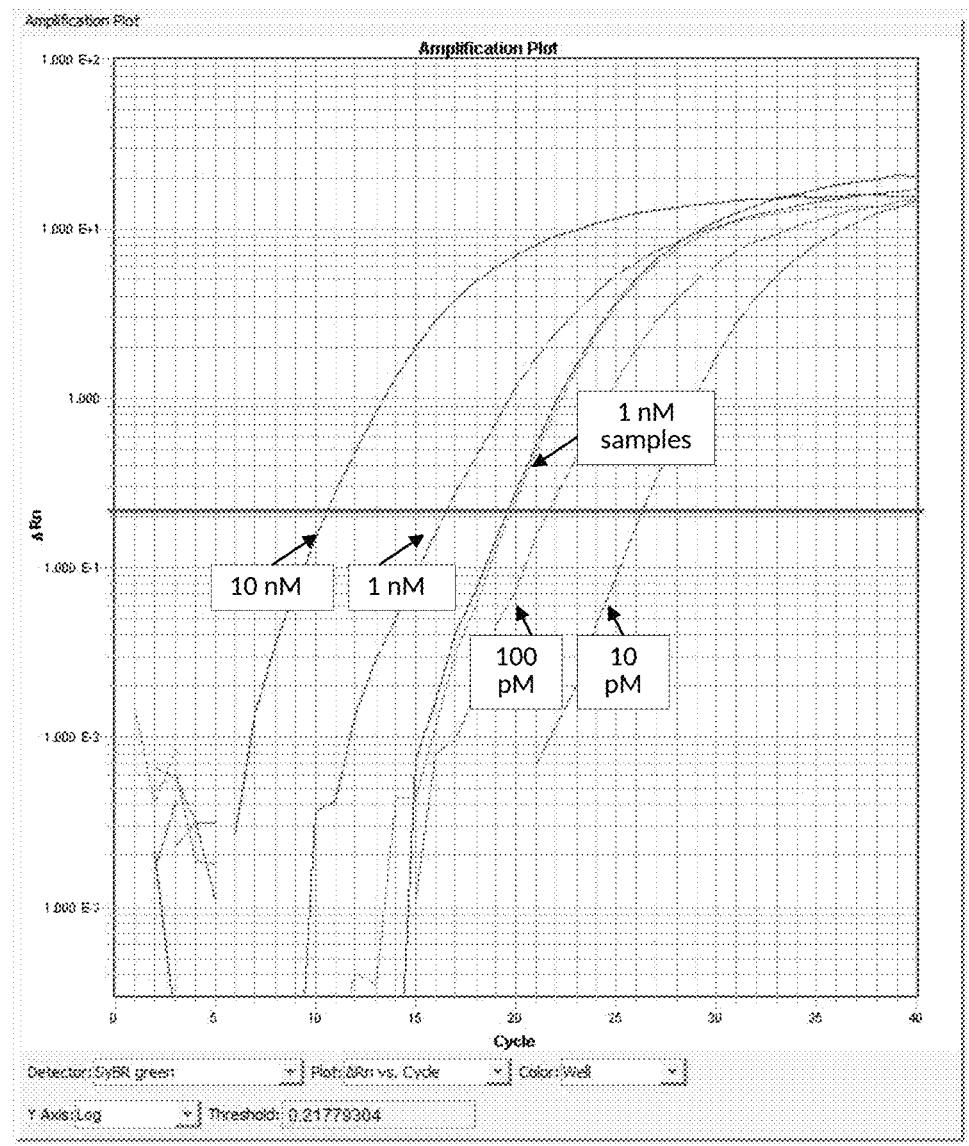
FIG. 10. KPC amplification curves for standard concentrations and eluted fractions collected from monoliths. Blue—sample extracted from hybridization buffer, green—sample extracted from bacterial lysate; violet and brown—calibration standards.

In order to verify the presence of KPC amplicon in the eluent collected from the outlet of the device, real-time qPCR was used for quantification of the amplicon (see Materials and Methods, Section 6 for details). Dilution attributed to the dead volume of the connectors, flow meter and tubing between the monolithic column and the outlet decreases amplicon concentration in the 3 µL collected fraction. FIG. 10 shows amplification curves confirming similar concentrations of the amplicon in the collected, eluted fractions for amplicon spiked into bacterial lysate or amplicon in hybridization buffer. These experiments confirm that sepsis-related DNA capture and elution is readily feasible in microdevices that have the single-step polymerized monolith formulation. Although the present DNA extraction monoliths were developed with the intent of integration with single-molecule counting detection [21], they could also readily be combined with on-chip PCR detection, as this technology has previously been implemented in microfluidics [8].

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

TABLE 1

| oligo name | sequence (5'→3') |
|---|---|
| acrd-KPC | Acrd-SP18-TATCGCCGTCTAGTTCTGCTGTCTTG |
| NH$_2$-KPC | NH$_2$-SP18-TATCGCCGTCTAGTTCTGCTGTCTTG |
| F1-KPC | F1-CATTCAAGGGCATCTTTCCGAGATGGGTGACCA CGGAACCAGCGGATGCCCATGCCCTATCAGTCAAGA CAGCAGAACTAGACGGCGATA |
| KPC | CATTCAAGGGCATCTTTCCGAGATGGGTGACCACGG AACCAGCGGATGCCCATGCCCTATCAGTCAAGACAG CAGAACTAGACGGCGATA |
| comp-KPC | TATCGCCGTCTAGTTCTGCTGTCTTGACTGATAGGG CATGGGCATCCGCTGGTTCCGTGGTCACCCATCTCG GAAAGATGCCCTTGAATG |
| MP1 | FAM-GGGCATCCGCTGGTTCCGTGGTCACCCATCT CGGAAAGATGCCC-BHQ1 |
| MP2 | FAM-TATCCGCTGGTTCCGTGGTCACCCATCTCGG AAAGATC-FAM |
| KPC amplicon | GCGCTGAGGAGCGCTTCCCACTGTGCAGCTCATTC AAGGGCTTTCTTGCTGCCGCTGTGCTGGCCAAGAC AGCAGAACTAGACGGCGATATGGACACACCCATCC GTTACGGCAAAAATGCGCTGGTTCCGTGGTCACCC ATCTCGGAAAAATATCTGACAACAGGCATGACGGT GGC |

DNA oligonucleotide sequences.
Acrd = acrydite, NH$_2$ = aminohexyl, SP18 = 18 carbon atom spacer,
F1 = fluorescein, FAM = 6-carboxyfluorescein,
BHQ1 = Black Hole Quencher 1.

TABLE S1

Sequences of primers for KPC amplicon.

| Primer | Sequence (5'→3') |
|---|---|
| Forward | CTCGAACAGGACTTTGGCGGCTC |
| Reverse | GCCACCGTCATGCCTGTTGTCAG |

TABLE S2

Ct values obtained from real time PCR amplification in FIG. 10.

| | calibration standards | | | | collected eluent | |
|---|---|---|---|---|---|---|
| | 10 nM | 1 nM | 100 pM | 10 pM | 1 nM KPC in buffer | 1 nM KPC in |
| Ct value | 10.6 | 16.6 | 21.7 | 26.4 | 19.6 | 20.4 |

TABLE OF CITED REFERENCES

[1] I. E. Robledo, E. E. Aquino, G. J. Vázquez, Detection of the KPC Gene in *Escherichia coli, Klebsiella pneumoniae, Pseudomonas aeruginosa*, and *Acinetobacter baumannii* during a PCR-Based Nosocomial Surveillance Study in Puerto Rico, Antimicrob. Agents Chemother 55 (2011) 2968-2970.

[2] S. Bratu, P. Tolaney, U. Karumudi U, J. Quale, M. Mooty, S. Nichani, D. Landman, Carbapenemase-producing *Klebsiella pneumoniae* in Brooklyn, N.Y.: molecular epidemiology and in vitro activity of polymyxin B and other agents, J. Antimicrob. Chemother 56 (2005) 128-132.

[3] K. F. Anderson, D. R. Lonsway, J. K. Rasheed, J. Biddle, B. Jensen, L. K. McDougal, R. B. Carey, A. Thompson, S. Stocker, B. Limbago, J. B. Patel, Evaluation of Methods To Identify the *Klebsiella pneumoniae* Carbapenemase in Enterobacteriaceae, J. Clin. Microbiol. 45 (2007) 2723-2725.

[4] R. S. Arnold, K. A. Thom, S. Sharma, M. Phillips, J. K. Johnson, D. J. Morgan, Emergence of *Klebsiella pneumoniae* Carbapenemase (KPC)-Producing Bacteria, South Med. J. 104 (2011) 40-45.

[5] A. Raghunathan, L. Samuel, R. J. Tibbetts, Evaluation of a Real-Time PCR Assay for the Detection of the *Klebsiella pneumoniae* Carbapenemase Genes in Microbiological Samples in Comparison With the Modified Hodge Test, Am. J. Clin. Pathol. 135 (2011) 566-571.

[6] M. W. Pletz, N. Wellinghausen, T. Welte, Will polymerase chain reaction (PCR)-based diagnostics improve outcome in septic patients? A clinical view, Intensive Care Med. 37 (2011) 1069-1076.

[7] M. C. Giuffrida, G. Spoto, Integration of isothermal amplification methods in microfluidic devices: Recent advances, Biosens. Bioelectron. 90 (2017) 174-186.

[8] Y. Zhang, H.-R. Jiang, A review on continuous-flow microfluidic PCR in droplets: Advances, challenges and future, Anal. Chim. Acta 914 (2016) 7-16.

[9] R. Bumgarner, DNA microarrays: Types, Applications and their future, Curr. Protoc. Mol. Biol. 22 (2013) 22.1.

[10] E. Servoli, H. Feitsma, B. Kaptheijns, P. J. van der Zaag, R. Wimberger-Friedl, Improving DNA capture on microarrays by integrated repeated denaturing, Lab Chip 12 (2012) 4992-4999.

[11] R. Knob, V. Sahore, M. Sonker, A. T. Woolley, Advances in monoliths and related porous materials for microfluidics, Biomicrofluidics 10 (2016) 032901.

[12] J. C. Masini, F. Svec, Porous monoliths for on-line sample preparation: A review, Anal. Chim. Acta 964 (2017) 24-44.

[13] M.-L. Hsieh, L.-K. Chau, Y.-S. Hon, Single-step approach for fabrication of vancomycin-bonded silica monolith as chiral stationary phase, J. Chromatogr. A 1358 (2014) 208-216.

[14] H. Lyu, H. Zhao, W. Qin, Z. Xie, Preparation of a long-alkyl-chain-based hybrid monolithic column with mixed-mode interactions using a "one-pot" process for pressurized capillary electrochromatography, J. Sep. Sci. 40 (2017) 4521-4529.

[15] Q. Zhang, J. Guo, F. Wang, J. Crommen, Z. Jiang, Preparation of a β-cyclodextrin functionalized monolith via a novel and simple one-pot approach and application to enantioseparations, J. Chromatogr. A, 1325 (2014) 147-154.

[16] R. A. Zangmeister, M. J. Tarlov, UV Graft Polymerization of Polyacrylamide Hydrogel Plugs in Microfluidic Channels, Langmuir 19 (2003) 6901-6904.

[17] A. Chan, U. J. Krull, Capillary electrophoresis for capture and concentrating of target nucleic acids by affinity gels modified to contain single-stranded nucleic acid probes, Anal. Chim. Acta 578 (2006) 31-42.

[18] R. Knob, D. B. Nelson, R. A. Robison, A. T. Woolley, Sequence-specific DNA solid-phase extraction in an on-chip monolith: Towards detection of antibiotic resistance genes, J. Chromatogr. A 1523 (2017) 309-315.

[19] M. Alizadeh, R. L. Wood, C. M. Buchanan, C G. Bledsoe, M. E. Wood, D. S. McClellan, R. Blanco, T. V. Raysten, G. A. Hussein, C. L. Hickey, R. A. Robison, W. G. Pitt, Rapid separation of bacteria from blood—Chemical aspects, Colloids Surf. B Biointerfaces 154 (2017) 365-372.

[20] C. M. Buchanan, R. L. Wood, T. R. Hoj, M. Alizadeh, C. G. Bledsoe, M. E. Wood, D. S. McClellan, R. Blanco, C. L. Hickey, T. V. Raysten, G. A. Husseini, R. A. Robison, W. G. Pitt, Rapid separation of very low concentrations of bacteria from blood, J. Microbiol. Methods 139 (2017) 48-53.

[21] T. Wall, J. McMurray, G. Meena, V. Ganjalizadeh, H. Schmidt, A. R. Hawkins, Optofluidic Lab-on-a-Chip Fluorescence Sensor Using Integrated Buried ARROW (bARROW) Waveguides, Micromachines 8 (2017) 252.

[22] M. Sonker, R. Yang, V. Sahore, S. Kumar, A. T. Woolley, On-chip fluorescent labeling using reversed-phase monoliths and microchip electrophoretic separations of selected preterm birth biomarkers, Anal. Methods 8 (2016) 7739-7746.

[23] Y. Li, H. D. Tolley, M. L. Lee, Poly[hydroxyethyl acrylate-co-poly(ethylene glycol) diacrylate] Monolithic Column for Efficient Hydrophobic Interaction Chromatography of Proteins, Anal. Chem. 81 (2009) 9416-9424.

[24] P. HemstrÖm, A. Nordborg, K. Irgum, F. Svec, J. M. Fréchet, Polymer-based monolithic microcolumns for hydrophobic interaction chromatography of proteins, J. Sep. Sci. 29 (2006) 25-32.

[25] I. Nischang, Porous polymer monoliths: Morphology, porous properties, polymer nanoscale gel structure and their impact on chromatographic performance, J. Chromatogr. A 1287 (2013) 39-58.

[26] M. Glazer, J. A. Fidanza, G. H. McGall, M. O. Trulson, J. E. Forman, A. Suseno, C. W. Frank, Kinetics of oligonucleotide hybridization to photolithographically patterned DNA arrays, Anal. Biochem. 358 (2006) 225-238.

[27] H. Koltai, C. Weingarten-Baor, Specificity of DNA microarray hybridization: characterization, effectors and approaches for data correction, Nucleic Acids Res. 36 (2008) 2395-2405.

[28] K. Rombouts, K. Braeckmans, K. Remaut, Fluorescent Labeling of Plasmid DNA and mRNA: Gains and Losses of Current Labeling Strategies, Bioconjugate Chem. 27 (2016) 280-297.

[29] J. Huang, X. Yang, X. He, K. Wang, J. Liu, H. Shi, Q. Wang, Q. Guo, D. He, Design and bioanalytical applications of DNA hairpin-based fluorescent probes, Trends Anal. Chem. 53 (2014) 11-20.

[30] A. K. Raap, J. G. J. Marijnen, J. Vrolijk, M. van der Ploeg, Denaturation, Renaturation, and Loss of DNA During In Situ Hybridization Procedures, Cytometry 7 (1986) 235-242.

[31] Y. Gao, L. K. Wolf, R. M. Georgiadis, Secondary structure effects on DNA hybridization kinetics: a solution versus surface comparison, Nucleic Acids Res. 34 (2006) 3370-3377.

[32] G. Rizzi, J.-R. Lee, P. Guldberg, M. Dufva, S. X. Wang, M. F. Hansen, Denaturation strategies for detection of double stranded PCR products on GMR magnetic biosensor array, Biosens. Bioelectron. 93 (2017) 155-160.

[33] J. J. Chen, M. H. Liao, K. T. Li, C. M. Shen, One-heater flow-through polymerase chain reaction device by heat pipes cooling, Biomicrofluidics 9 (2015) 014107.

What is claimed is:

1. A method for creating a monolith in an internal void space of a microfluidic device, comprising:
    filling the internal void space of the microfluidic device with a polymerization mixture solution comprising one or more photopolymerizable acrylate monomers, a photo initiator, a porogen, and an acrydite-modified capture oligonucleotide,
the acrydite-modified capture oligonucleotide added to the polymerization mixture solution in a dissolved form that is solubly miscible in the polymerization mixture solution;
    masking the microfluidic device to prevent light from reaching the internal void space with the exception of a gap to allow light to reach a preselected portion of the internal void space;
    exposing the microfluidic device to light to polymerize the polymerization mixture solution in the preselected portion to form in the preselected portion the monolith having a polymerized porous structure with the acrydite-modified capture oligonucleotide providing functionality on a surface of the polymerized porous structure of the monolith,
with the polymerized porous structure of the monolith anchored on a microfluidic device surface within the preselected portion;
    rinsing unpolymerized polymerization mixture from the internal void space, leaving in the internal void space the polymerized porous structure of the monolith with acrydite-modified capture oligonucleotide functionality.

2. The method of claim 1 wherein the microfluidic device is exposed to ultra-violet light.

3. The method of claim 1 wherein the filling, masking, exposing, and rinsing steps are conducted once in a single step.

4. The method of claim 1 wherein the one or more photopolymerizable acrylate monomers are one or more from the group of PEGDA and EDMA.

5. The method of claim 1 wherein the capture oligonucleotide is complementary to a target DNA sequence.

6. The method of claim 1 wherein the capture oligonucleotide is complementary to a target from a gene from a microorganism.

7. The method of claim 1 wherein the capture oligonucleotide is complementary to a target from a gene from DNA of a bacterium.

8. The method of claim 1 wherein the capture oligonucleotide is complementary to a target from an antibiotic resistance gene.

9. The method of claim 8 wherein the capture oligonucleotide is complementary to portion of the KPC gene, or NDM gene, or VIM gene.

10. The method of claim 1 wherein the microfluidic device is of polypropylene.

11. The method of claim 1 wherein the preselected portion of the void spaces includes a channel.

12. The method of claim 1 wherein the acrylate monomers comprise at least one diacrylate.

13. The method of claim 1 wherein the dissolved form of the acrydite-modified capture oligonucleotide comprises a solution containing an alcohol and water.

14. The method of claim 1 wherein the dissolved form of the acrydite-modified capture oligonucleotide is a 1:1 solution of 2-propanol:water.

\* \* \* \* \*